W. REITE.
Saw-Sets.

No. 148,576.

Patented March 17, 1874.

Witnesses:
Geo. W. Tibbetts
Louis H. Petenhagen

Inventor;
Wm Reite

UNITED STATES PATENT OFFICE.

WILLIAM REITE, OF CLEVELAND, OHIO, ASSIGNOR TO CATHARINE REITE, OF SAME PLACE.

IMPROVEMENT IN SAW-SETS.

Specification forming part of Letters Patent No. 148,576, dated March 17, 1874; application filed August 16, 1873.

*To all whom it may concern:*

Be it known that I, WILLIAM REITE, of Cleveland, Cuyahoga county, Ohio, have invented a Saw-Set, of which the following is a specification:

This invention has for its object to set the teeth of saws rapidly, by a combination of levers operating the dies in such a manner that the upper die has a draw movement while bending the tooth, so as to sharpen the point of the tooth at the same time that the tooth is set. It is capable, also, of setting teeth on a variety of sizes of saws, by changing the dies for that purpose.

My machine is fully illustrated in the accompanying drawings, in which—

Figure 1:
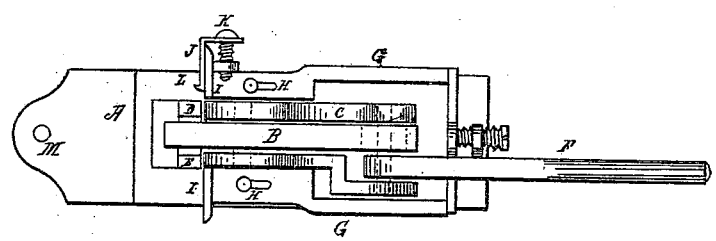
Figure 2:
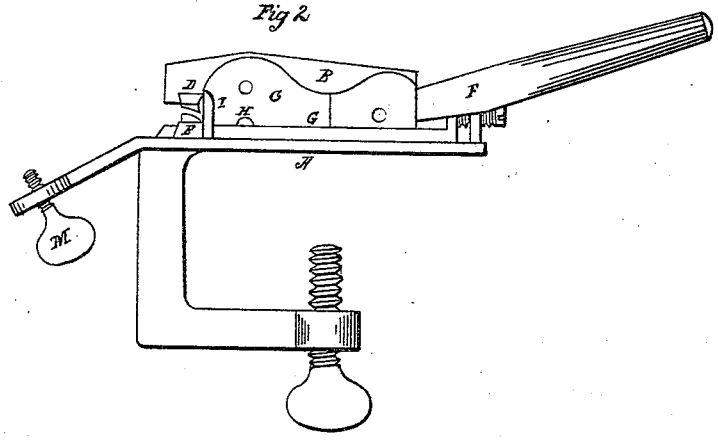

Figure 1 is a plan view, and Fig. 2 is a side elevation.

A is a plate, on which are arranged the operating parts. It is provided with a clamp and screw on the under side, for securing it to a work bench or table. B is a lever, pivoted between two upright side plates, C C, in the front end of which is placed a die, D, the counter-die E being set in the bed-plate A. These dies are set in dovetail sockets, which enable them to be removed or changed. The peculiar construction of these dies is, that their pressing-faces are curved, so that when they are brought together and press the tooth, it is bent in a curved and not in an angular form. This obviates the liability of breaking the tooth off, and at the same time the lever B, carrying the upper die, has a curved movement from its pivoted center, which gives a draw movement of the die on the tooth, pressing the point flatter, and thus sharpening the point, whereby the saw requires very little or no filing. F is a lever, pivoted between the plates C C. Said lever has a cam playing under the end of and operating the lever B. G is a guide-frame, placed on the plate A, and secured by set-screws H H, and there is also an adjusting-screw at the rear end of the plate A, for adjusting it in position. The front ends of the said guide-frame G have faces I I, arranged as guides for the saw to slide against when being operated upon. One of said faces I is provided with a gage-plate, J, fixed thereon by a set-screw, K, and has a lug or projection, L, against which the teeth of the saw rest, and which guides each succeeding tooth to the dies readily. The front end of the plate A is bent downward, and is provided with an adjusting-screw, M, for adjusting the slant of the saw-plate to the dies.

This little machine is very useful for setting the teeth of various sizes of saws, circular as well as straight.

I claim—

The lever B carrying the die D, the counter-die E, the lever F, plates C C, guide-frame G with gage J L with its adjusting-screw K, all combined and arranged with the plate A and its clamp-screw, and the adjusting-screw M, as shown and described, and for the purpose set forth.

WM. REITE.

Witnesses:
GEO. W. TIBBITTS,
GEO. A. KOLBE.